_(12)_ United States Patent
Laster

(10) Patent No.: US 10,324,175 B2
(45) Date of Patent: Jun. 18, 2019

(54) OPERATING A SONAR TRANSDUCER

(71) Applicant: Navico Holding AS, Egersund (NO)

(72) Inventor: Matthew Laster, Broken Arrow, OK (US)

(73) Assignee: NAVICO HOLDING AS, Egersund (NO)

( * ) Notice: Subject to any disclaimer, the term of this patent is extended or adjusted under 35 U.S.C. 154(b) by 670 days.

(21) Appl. No.: 14/566,504

(22) Filed: Dec. 10, 2014

(65) Prior Publication Data

US 2016/0170013 A1 Jun. 16, 2016

(51) Int. Cl.
| | |
|---|---|
| *G01S 7/60* | (2006.01) |
| *G01S 15/89* | (2006.01) |
| *G01S 7/62* | (2006.01) |
| *G01S 15/88* | (2006.01) |
| *G01S 15/02* | (2006.01) |
| *G01S 7/00* | (2006.01) |

(52) U.S. Cl.
CPC ............. *G01S 7/60* (2013.01); *G01S 7/003* (2013.01); *G01S 7/629* (2013.01); *G01S 7/6218* (2013.01); *G01S 7/6281* (2013.01); *G01S 15/025* (2013.01); *G01S 15/88* (2013.01); *G01S 15/89* (2013.01)

(58) Field of Classification Search
CPC .......... G01S 7/60; G01S 15/89; G01S 7/6218; G01S 7/003; G01S 7/629; G01S 15/88; G01S 15/025; G01S 7/6281
See application file for complete search history.

(56) References Cited

U.S. PATENT DOCUMENTS

| | | | | |
|---|---|---|---|---|
| 3,159,806 | A | * 12/1964 | Piasecki | G01S 15/04 114/245 |
| 3,304,532 | A | 2/1967 | Nelkin | |
| 3,417,369 | A | 12/1968 | Richard | |
| 3,451,038 | A | 6/1969 | Maass | |
| 3,761,873 | A | 9/1973 | Hopkin | |
| 3,975,704 | A | 8/1976 | Klein | |
| 4,096,484 | A | 6/1978 | Ferre et al. | |
| 4,164,379 | A | * 8/1979 | Denman | G05D 1/0206 367/106 |
| 4,281,427 | A | * 8/1981 | Petters | H01Q 1/1292 116/210 |
| 4,686,659 | A | 8/1987 | Yamamoto | |
| 4,686,959 | A | 8/1987 | Yamamoto | |
| 4,893,286 | A | 1/1990 | Cobb | |
| 4,953,147 | A | 8/1990 | Cobb | |

(Continued)

OTHER PUBLICATIONS

"Deeper"; https://deepersonar.com/en; (retrieved May 22, 2017).

(Continued)

*Primary Examiner* — Isam A Alsomiri
*Assistant Examiner* — Amie M Ndure
(74) *Attorney, Agent, or Firm* — Nelson Mullins Riley & Scarborough LLP

(57) ABSTRACT

Various implementations described herein are directed to a non-transitory computer readable medium having stored thereon computer-executable instructions which, when executed by a computer, may cause the computer to sense deployment of a transducer in water based on receiving sonar data from the transducer. The computer may automatically trigger at least one event upon receiving the sonar data. The at least one event may include recording the sonar data generated by the transducer.

20 Claims, 9 Drawing Sheets

(56) References Cited

U.S. PATENT DOCUMENTS

| | | | |
|---|---|---|---|
| 5,483,767 A * | 1/1996 | Langer | A01K 79/02 |
| | | | 43/4 |
| 6,909,669 B1 | 6/2005 | Yankielun et al. | |
| 7,813,224 B2 | 10/2010 | Krumhansl et al. | |
| 9,182,234 B2 | 11/2015 | Ninomiya et al. | |
| 2004/0004904 A1* | 1/2004 | Betts | A01K 93/02 |
| | | | 367/3 |
| 2004/0068371 A1* | 4/2004 | Estep | G01S 5/0063 |
| | | | 701/468 |
| 2006/0159524 A1* | 7/2006 | Thompson | B63C 11/00 |
| | | | 405/190 |
| 2006/0238383 A1* | 10/2006 | Kimchi | G06F 17/30241 |
| | | | 340/995.1 |
| 2007/0147173 A1* | 6/2007 | Park | G01S 7/521 |
| | | | 367/107 |
| 2008/0236275 A1 | 10/2008 | Breed et al. | |
| 2008/0282817 A1 | 11/2008 | Breed | |
| 2009/0058593 A1 | 3/2009 | Breed | |
| 2009/0231953 A1 | 9/2009 | Welker et al. | |
| 2010/0085198 A1* | 4/2010 | Boss | G01F 23/0007 |
| | | | 340/618 |
| 2010/0157736 A1 | 6/2010 | Riordan et al. | |
| 2010/0199225 A1 | 8/2010 | Coleman et al. | |
| 2011/0132093 A1 | 6/2011 | Citta | |
| 2014/0071167 A1 | 3/2014 | Lauenstein et al. | |
| 2015/0138923 A1 | 5/2015 | Abernathy et al. | |
| 2015/0138924 A1 | 5/2015 | Schaefers et al. | |
| 2015/0293213 A1 | 10/2015 | Felber | |
| 2016/0170013 A1 | 6/2016 | Laster | |

OTHER PUBLICATIONS

"Deeper"; Deeper, UAB; deeper.eu; 2012-2016; (retrieved May 22, 2017).

"Humminbird RF"; https://www.humminbird.com/productDetail-Lifestyle.aspx?ed=763; 2017; (retrieved Jun. 8, 2017).

"Vexilar SonarPhone"; vexilar.com; 2017; (retrieved May 22, 2017).

* cited by examiner

OPERATING A SONAR TRANSDUCER

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Communicating data, including, for example, sonar data, can be useful. Communicating with a device that can collect this data can provide advantages to a boat pilot. Such advantages can include using this data to perform various actions.

SUMMARY

Described herein are implementations of various technologies for a method of operating a sonar transducer. In one implementation, a non-transitory computer-readable medium having stored thereon a plurality of computer-executable instructions which, when executed by a computer, cause the computer to perform various actions. The actions may include sensing deployment of a transducer in a body of water based on receiving a first signal from the transducer. The first signal may include a first command to start recording sonar data generated by the transducer. The actions may further include automatically triggering at least one event upon receiving the sonar data. The at least one event may include recording the sonar data generated by the transducer.

Described herein are also implementations of various technologies for a castable sonar transducer. In one implementation, the castable sonar transducer may include electrode terminals configured to activate the castable sonar transducer when the castable sonar transducer is deployed in water. The castable sonar transducer may include a processor and memory including instructions that cause the processor to perform various actions. The actions may include transmitting a first command signal to a computing device to start recording sonar data in response to the castable sonar transducer detecting deployment in water.

Described herein are also implementations of various technologies for a non-transitory computer-readable medium having stored thereon a plurality of computer-executable instructions which, when executed by a computer, cause the computer to perform various actions. The actions may include sensing deployment of a castable sonar transducer in water based on receiving sonar data from the castable sonar transducer. The actions may include automatically recording the sonar data generated by the castable sonar transducer upon receiving the sonar data from the castable sonar transducer.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Various implementations described herein are directed to operating a sonar transducer. In one implementation, such operation may include auto-recording sonar data received from a castable sonar transducer. When a sensor on the castable sonar transducer senses water, the transducer is turned on. For instance, the sensor on the castable sonar transducer may be configured to sense water after casting the castable sonar transducer in water by a user. The castable sonar transducer may be configured to send a signal to a computing device (e.g., a multi-function display (MFD), tablet, smart phone, etc.) to automatically start recording the sonar data and create a sonar log. When the castable sonar transducer is removed from the water (e.g., removing/withdrawing the castable sonar transducer from the water by a user), the transducer may be configured to turn off and send another signal to the computing device to stop recording the sonar data. In some implementations, the computing device may be configured to upload the sonar data and/or the sonar log to a network server, such as a cloud. The computing device may be configured to store/record multiple sonar logs and create a map therefrom. In some other implementations, the computing device and/or the cloud maybe configured to create a map by stitching multiple sonar logs together.

In one implementation, operating a sonar transducer may include auto-recording of sonar data received from and generated by a vessel-mounted (or coupled) sonar transducer. When a sensor on the vessel-mounted sonar transducer senses water, the transducer is turned on. For instance, the sensor on the vessel-mounted transducer may be configured to sense water after launching of the vessel in water by a user. The vessel-mounted transducer may be configured to send a signal to a computing device (e.g., a multi-function display (MFD), tablet, smart phone, etc.) to automatically start recording the sonar data and create a sonar log. When the vessel-mounted transducer is removed from the water (e.g., removing/withdrawing the vessel from the water by a user), the vessel-mounted transducer may be configured to turn off and send another signal to the computing device to stop recording the sonar data. In some implementations, the computing device may be configured to upload the sonar data and/or the sonar log to a network server, such as a cloud. The computing device may be configured to store/record multiple sonar logs and create a map therefrom. In some other implementations, the computing device and/or the cloud may be configured to create a map by stitching multiple sonar logs together.

Various implementations of operating a sonar transducer described herein will now be described in more detail with reference to FIGS. 1A-6.

Figure 1A:
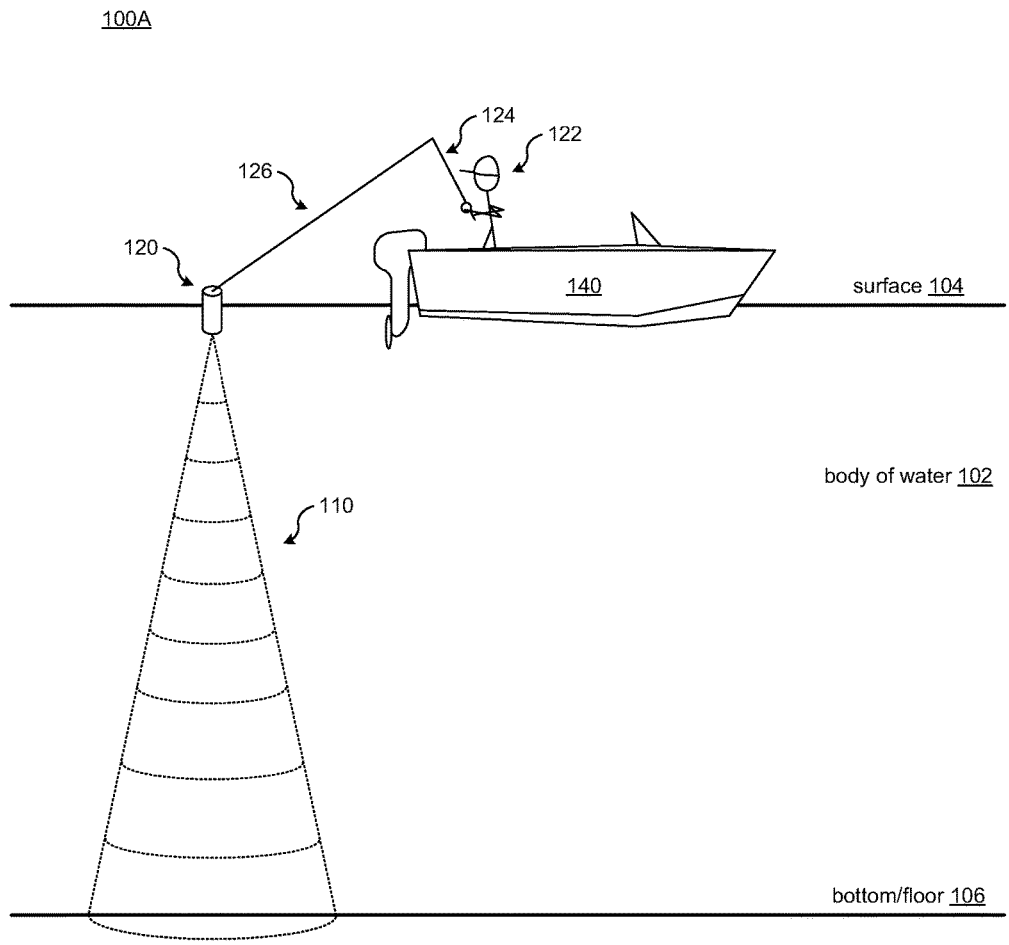
FIGS. 1A-1B illustrate views of a sonar beam in accordance with various implementations described herein.
Figure 1B:
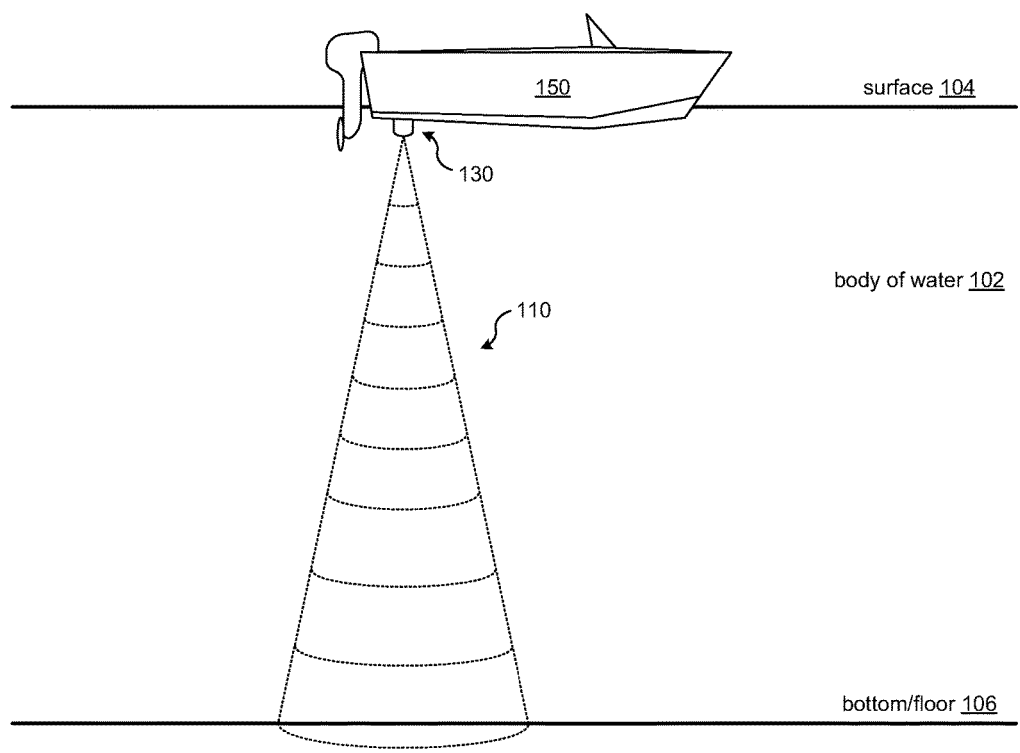

FIGS. 1A-1B illustrate views of a sonar beam 110 in accordance with various implementations described herein. In FIGS. 1A-1B, the sonar beam 110 may be generated by transducers 120, 130 in various deployment configurations. Each of the transducers 120, 130 may include a sonar transducer, such as a downscan transducer for capturing sonar data in a body of water 102. As will be shown below, various implementations described herein will refer to auto-recording sonar data using a castable sonar transducer and, alternatively a sonar transducer coupled or mounted on a vessel, e.g., a boat.

FIG. 1A illustrates a view of the sonar beam 110 in accordance with an implementation. The sonar beam 110 may occur in situations where the transducer 120 is employed in a first type of deployment configuration. For instance, the transducer 120 may include a castable sonar transducer having electrode terminals (not shown) as part of a dedicated sensor configured to activate the castable sonar transducer when the transducer 120 is deployed in water (e.g., the body of water 102). In this instance, the dedicated sensor may be configured for automatically sensing deployment of the transducer 120 in water, which may occur after casting the transducer 120 in the body of water 102 by a user 122. The castable sonar transducer may also be referred to herein as the sonar transducer or just simply the transducer. The transducer 120 may include one or more processing components (e.g., a processor) and memory including instructions configured to cause the processing component to perform various actions and/or functions including transmitting one or more command signals to a computing device (e.g., marine electronics device, multi-function display (MFD), smart phone, etc.) to start recording sonar data in response to the transducer 120 detecting deployment in water, such as the body of water 102. In some implementations, the memory instructions may be further configured to cause the processing component to automatically transmit the sonar data to the computing device for recording by the computing device.

In various implementations, the electrode terminals of the dedicated sensor may be further configured to deactivate the transducer 120 when the transducer 120 is removed from water, such as the body of water 102. Further, in some implementations, the memory instructions may be further configured to cause the processing component to transmit another command signal to the computing device to stop recording the sonar data in response to the transducer 120 detecting removal from the water.

In the example of FIG. 1A, the transducer 120 may be incorporated inside or attached to a castable device. For instance, as a castable device, the transducer 120 may be coupled to a casting device, such as a rod 124 (e.g., a fishing rod or pole), via a line 126 (e.g., a fishing line). The rod 124 may be configured for casting the transducer 120 by the user 122. As shown in FIG. 1A, the user 122 may cast the transducer 120 into the body of water 102, while the user 122 (e.g., boat pilot, fisherman, etc.) is positioned within a vessel 140, such as a boat, that is positioned in the body of water 102.

In one implementation, the dedicated sensor (e.g., water sensor) may be configured for automatically sensing removal of the transducer 120 from the body of water 102, which may occur after reeling in the transducer 120 out of the body of water 102 by the user 122. For instance, as a castable device, the transducer 120 may be coupled to the rod 124 and be reeled out of the body of water 102 by the user 122 via the line 126. The rod 124 may be configured as a user-actuable rod that is configured for reeling the transducer 120 by the user 122. As such, the user 122 may reel the transducer 120 out of the body of water 102, while the user 122 is positioned within the vessel 140.

As shown in FIG. 1A, the transducer 120 may be part of a device that is configured to at least partially float on a surface 104 of the body of water 102, or as part of a device that is configured to at least partially submerge below the surface 104 of the body of water 102. The sonar data generated by the transducer 120 may be used for imaging subsurface environmental features in the body of water 102, including mapping an underwater environment below the surface 104 of the body of water 102 between the surface 104 of the body of water 102 and a bottom or floor 106 of the body of water 102.

FIG. 1B illustrates a view of the sonar beam 110 in accordance with another implementation. The sonar beam 110 may occur in situations where the transducer 130 is employed in a second type of deployment configuration. For instance, the transducer 130 may include a vessel-mounted or vessel-coupled sonar transducer having electrode terminals (not shown) configured to activate the sonar transducer when the vessel is deployed in water (e.g., the body of water 102). The transducer 130 may include a processing component (e.g., a processor) and memory including instructions configured to cause the processing component to perform various actions and/or functions including transmitting one or more command signals to a computing device provided in/on the vessel (e.g., marine electronics device, multi-function display (MFD), smart phone, etc.) to start recording sonar data in response to the transducer 130 detecting deployment in water, such as the body of water 102. In some implementations, the memory instructions may be configured to cause the processing component to automatically transmit the sonar data to the computing device for recording by the computing device.

In various implementations, the electrode terminals may be further configured to deactivate the transducer 130 when the transducer 130 is removed from water along with the vessel 150. Further, the memory instructions may be further configured to cause the processing component to transmit another command signal to the computing device to stop recording the sonar data in response to the transducer 130 detecting removal from the water along with the vessel 150.

In the example of FIG. 1B, the transducer 130 may be coupled to a vessel 150 (e.g., a boat). The transducer 130 may include a dedicated sensor (e.g., water sensor) configured for automatically sensing deployment of the transducer 130 in the body of water 102, which may occur after launching the vessel 150 in/on the body of water 102. The transducer 130 may be coupled or mounted to the vessel 150 in any position and/or side thereof.

In one implementation, the dedicated sensor (e.g., water sensor) may be configured for automatically sensing removal of the transducer 130 from the body of water 102, which may occur after removing or withdrawing the vessel 150 out of the body of water 102 along with the transducer 130. As a vessel coupled/mounted device, the transducer 130 may be coupled to the vessel 150 and be removed from the body of water 102 when the vessel 150 is removed from the body of water 102.

In various implementations, the beam 110 of either transducer 120, 130 may include one or more of a conical beam projection and a linear beam projection. For example, the beam 110 of either or both transducers 120, 130 may include a conical downscan beam projection having an example coverage area of a beam produced by a circular downscan transducer. In another example, the beam 110 of either transducer 120, 130 may include a linear downscan beam projection having an example coverage area of a beam produced by a linear downscan transducer. Further, the transducers 120, 130 may include one or more or an array of sonar transducer elements configured to capture sonar data associated with the body of water 102.

Figure 2:
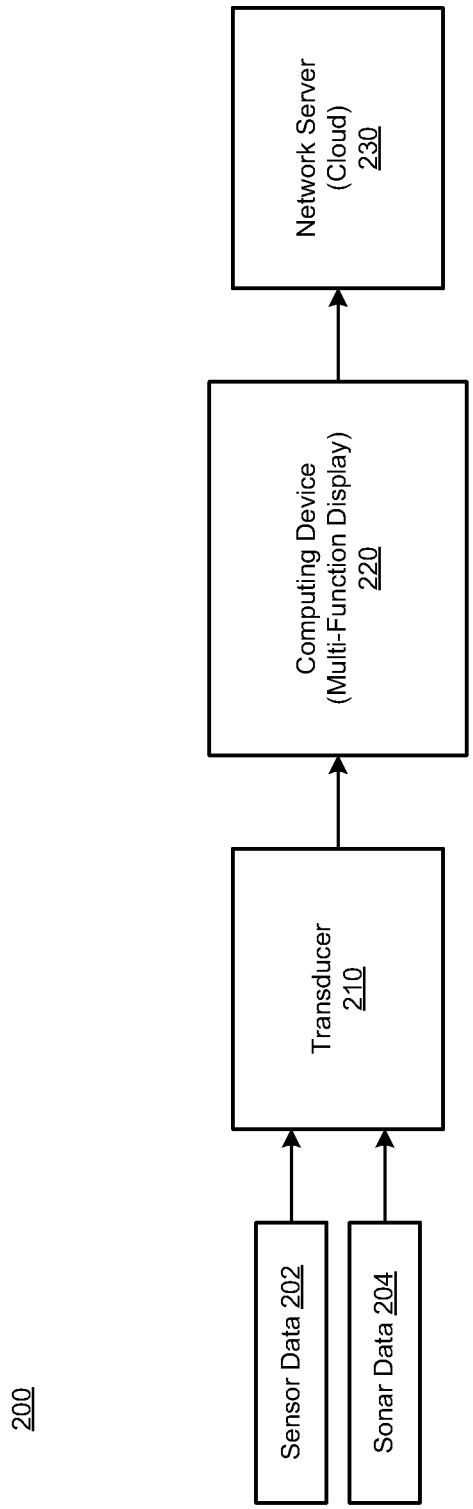
FIG. 2 illustrates how various data recorded by a sonar transducer may flow in accordance with various implementations described herein.

FIG. 2 illustrates a flow 200 of data in accordance with various implementations described herein. In FIG. 2, one or more of sensor data 202 and sonar data 204 may be received by a transducer 210 and transmitted to a computing device 220 (e.g., marine electronics device, MFD, a smart phone, etc.). In some examples, the computing device 220 may be configured to upload the sensor data 202 and/or the sonar data 204 to a network server 230 (e.g., cloud server) having memory and/or at least one database via a network (e.g., cloud based network). The computing device 220 may be configured to associate geo-coordinate data, such as global positioning system data (i.e., GPS data), to one or more of the sensor data 202, sonar data 204 at any time, including prior to upload. The network may include various types of communication networks and/or cloud based networks, including wired networks and/or wireless networks.

Figure 3A:
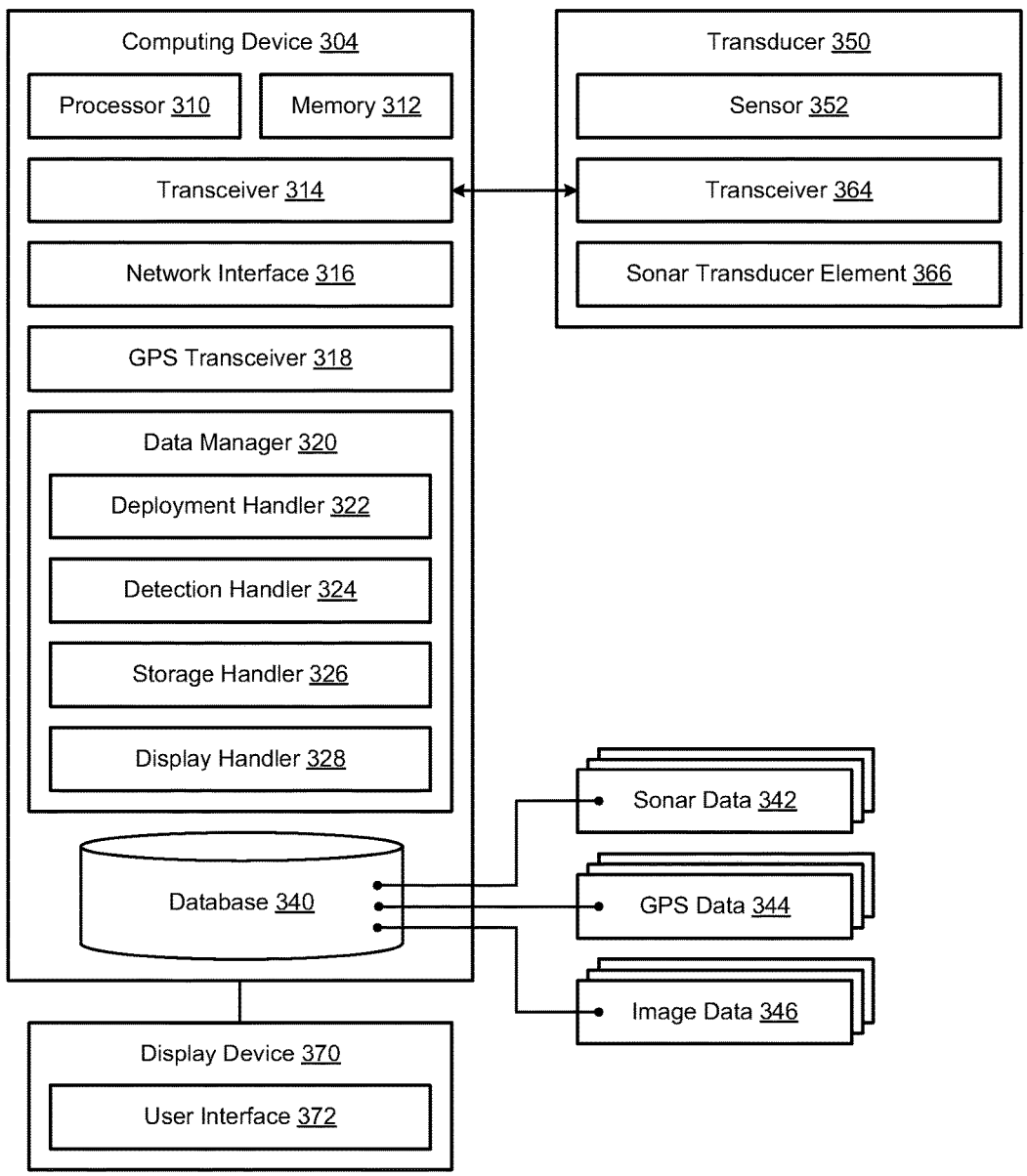
FIGS. 3A-3C illustrate systems for operating a sonar transducer in accordance with implementations of various techniques described herein.
Figure 3B:
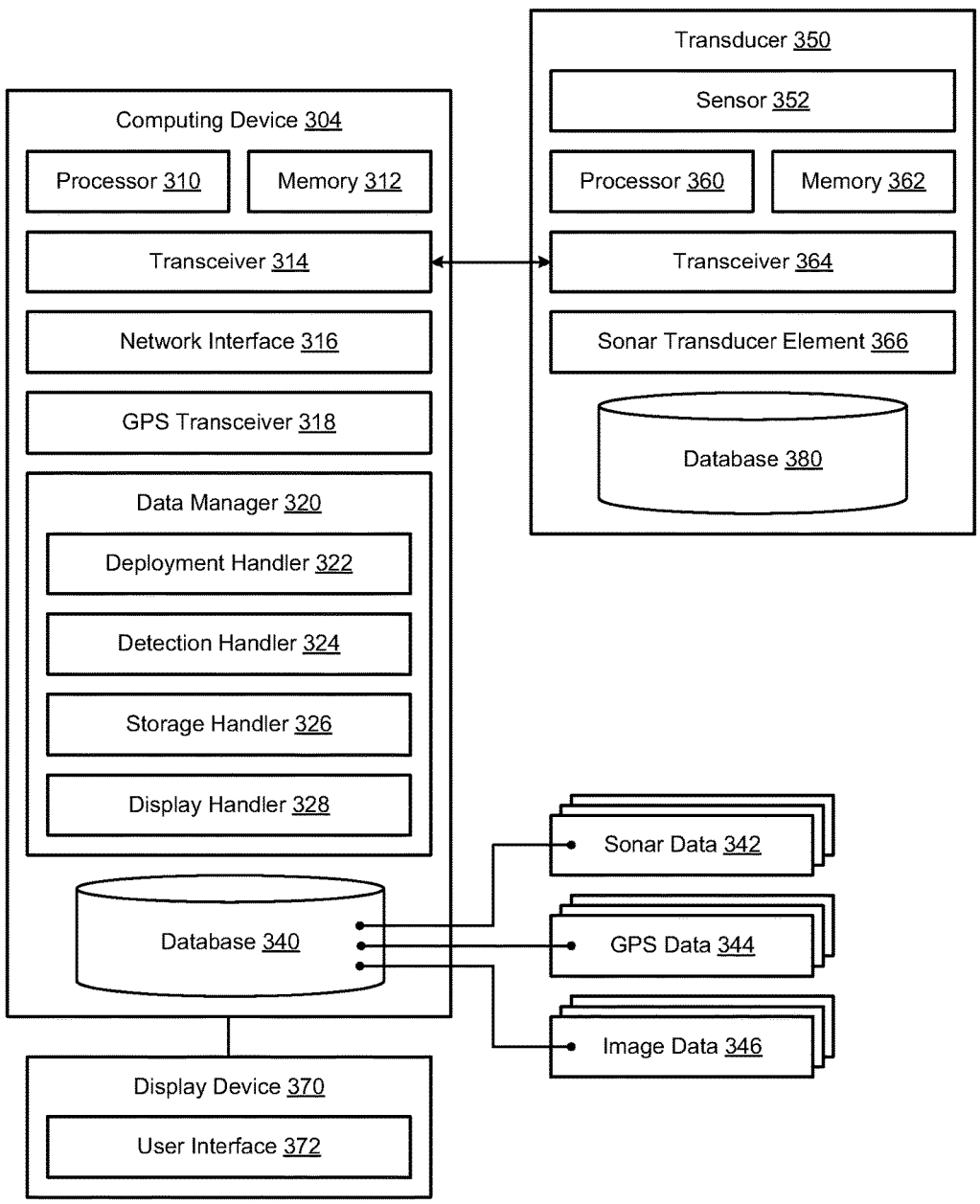
Figure 3C:
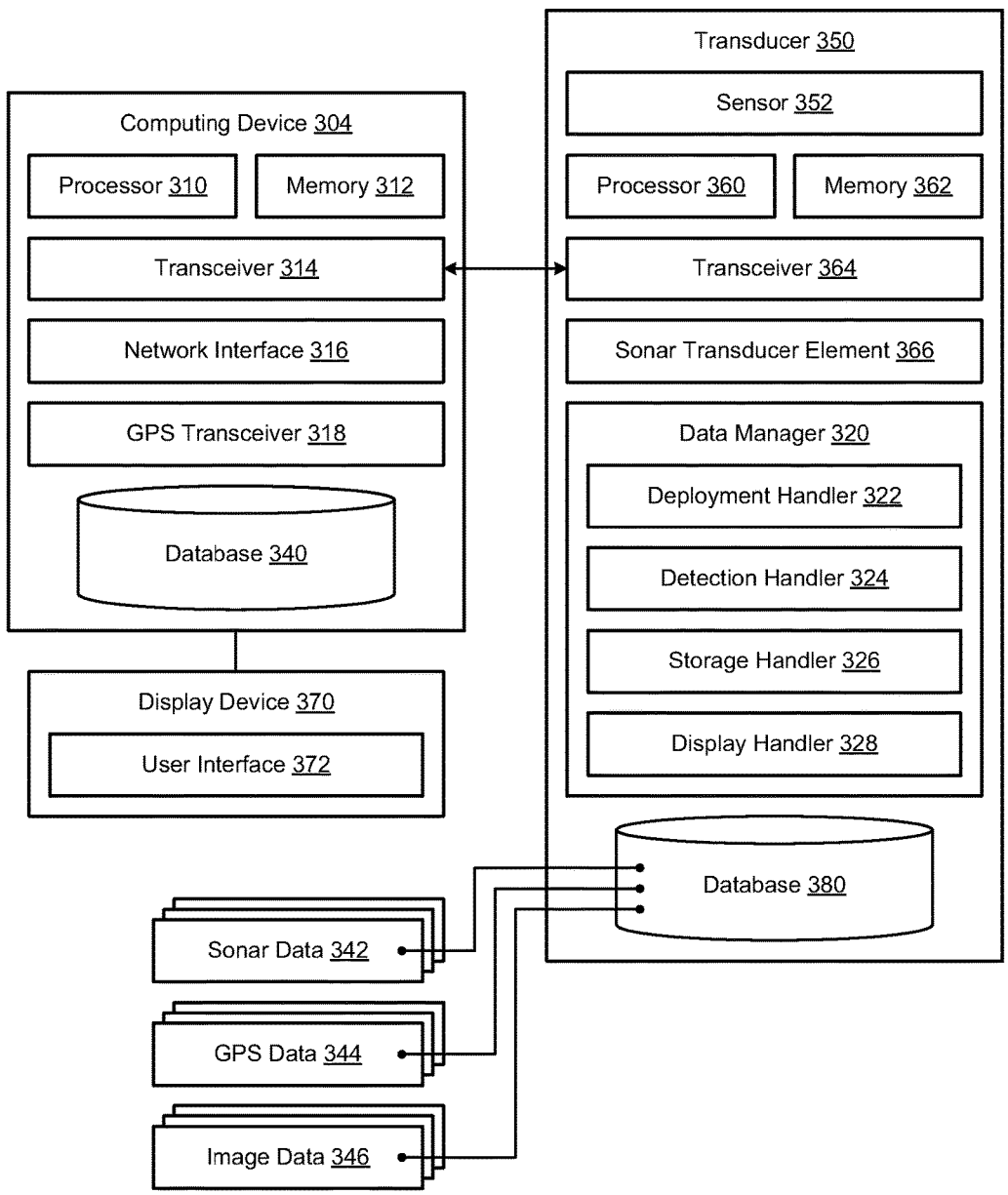

FIGS. 3A-3C illustrate various systems for operating a sonar transducer in accordance with implementations of various techniques described herein.

FIG. 3A illustrates a system 300A for operating a sonar transducer in accordance with implementations of various techniques described herein. In FIG. 3A, a computing device 304 may be used to collect various types of data and/or information related to imaging subsurface environmental features in a body of water, such as sonar data. Imaging subsurface environmental features in a body of water may include mapping an underwater environment below a surface of the body of water between the surface of the body of water and the bottom or floor of the body of water. In reference to FIG. 3A, the computing device 304 may refer to or embody a marine electronics device, such as a multi-function display (MFD), an example of which is described in FIG. 6, that may be used to record, store, display, receive, and transmit marine electronics data, including sonar data.

In the example of FIG. 3A, the system 300A includes a computing device 304 configured as a special purpose machine for interfacing with a transducer 350, such as a sonar transducer. In this example, the computing device 304 may include standard elements and/or components, including at least one processor 310, memory 312 (e.g., non-transitory computer-readable storage medium), at least one database 340, power, peripherals, and various other computing elements and/or components that may not be specifically shown in FIG. 3A. Further, the system 300A may be associated with a display device 370 (e.g., a monitor or other display) that may be used to provide a user interface (UI) 372, including a graphical user interface (GUI). In FIG. 3A, the display 370 is shown as a separate component; however, the display 370 may be incorporated as part of the computing device 304. The UI 372 may be used to receive one or more preferences from a user of the display device 370 for managing or utilizing the system 300A, including interfacing with the transducer 350. Further, the user may setup desired behavior of the computing system 304 and/or transducer 350 via user-selected preferences using the UI 372 associated with the display device 370. Various elements and/or components of the system 300 that may be useful for the purpose of implementing the system 300A may be added, included, and/or interchanged, in manner as described herein.

In one implementation, the computing device 304 may be configured as a multi-function display (MFD). As a MFD, the processor 310 of the computing device 304 may be used for marine based applications, which may include various capabilities for controlling operation of a vessel (e.g., a boat).

The computing device 304 may be configured to interface and communicate with the transducer 350. The computing device 304 may include a transceiver 314, such as a radio frequency (RF) transceiver, that may be configured to communicate with a corresponding transceiver 364 of the transducer 350. Using the transceivers 314, 364, various types of data including sonar data 342 may be communicated, transmitted, and/or relayed between the computing device 304 and the transducer 350. In some examples, the computing device 304 may be configured to receive and recognize sonar data communicated, transmitted, and/or relayed from the transducer 350 and begin to scroll and/or display the sonar data received form the transducer 350 to a user via the display device 370. The computing device 304 may further begin to display the sonar data according to the behavior setup by the user via the user-selected preferences inputted by the user via the UI 372. Further, the database 340 may be configured to store/record the sonar data 342 associated with the transducer 350. The database 340 may be configured to store/record image data 346 associated with the sonar data 342.

In one implementation, the computing device 304 may be configured to record and/or display sonar data to a user via the display device 370 when the transducer 350 is powered-up or powered-on and stop recording and/or displaying sonar data when the transducer 350 is powered-down or powered-off. When powered-up, the computing device 304 may begin recording and/or displaying the sonar data according to the behavior setup by the user, and when powered-down, the computing device 304 may stop recording and/or displaying the sonar data according to the behavior setup by the user.

In another implementation, the computing device 304 may automatically upload the sonar data to a remote server or database via a wired or wireless network. For instance, the computing device 304 may be configured to interface and communicate with a network server (e.g., cloud server) via a network (e.g., cloud based network). The computing device 304 may include a network interface 316, such as a wired or wireless device configured to interface and communicate with various types of network communication protocols (e.g., Ethernet, Bluetooth, Wi-Fi, LAN, WLAN, cellular, etc.). The computing device 304 may be configured to interface and communicate with one or more network servers over a network via one or more of the various types of network communication protocols. Using the network interface 316, various types of data including the sonar data 342 may be communicated, transmitted, and/or relayed between the computing device 304 and the network server(s). As such, the computing device 304 may be configured to automatically record the sonar data 342 in memory (e.g., database 340), display the sonar data 342 to a user via the display device 370, and upload the sonar data 342 to at least one database server via network, such as a wired or wireless network. The database server may be configured to store/record the sonar data 342 associated with the transducer 350 and/or the image data 346 associated with the sonar data 342.

The computing device 304 may include a global positioning system (GPS) transceiver 318, such as a radio frequency (RF) transceiver configured to receive GPS related data and/or information 344 from a global positioning satellite system, relay antenna, or the like. The GPS data 344 may include geo-coordinate, geo-spatial, and/or geographical positioning related data generated and/or received by the GPS transceiver 318. The GPS data 344 may be associated with tracking geospatial coordinates of the computing device 304 and/or the transducer 350. The GPS data 344 may be communicated, transmitted, and/or relayed between the computing device 304 and a network database server. The database 340 may be configured to store/record the GPS data 344 in association with the sonar data 342, which may be associated with the transducer 350. The database 340 may also be further configured to store/record image data 346 associated with the GPS data 344 and the sonar data 342.

In one implementation, the computing device 304 may include computer-executable instructions related to a data manager or module 320 configured to cause the at least one processor 310 to manage the sonar data 342. In some examples, the data manager 320 may be configured to manage geographical positioning related data (i.e., GPS data 344) received and/or generated by the GPS transceiver 318. The geographical positioning related data may be associated with tracking geospatial coordinates. As described, the computer-executable instructions may be stored/recorded on a non-transitory computer-readable storage medium (e.g., memory 312).

The data manager 320 may include computer-executable instructions related to a deployment handler or software module 322 configured to sense deployment of the transducer 350 in a body of water based on receiving a first signal from the transducer 350. The first signal may include a first command to start recording the sonar data 342 received form and generated by the transducer 350. The deployment handler 322 may be configured to sense deployment of the transducer 350 (e.g., castable sonar transducer) in water (e.g., a body of water) based on receiving the sonar data 342 from the transducer 350 (e.g., castable sonar transducer). In some examples, the deployment handler 322 may be configured to sense removal of the transducer 350 from the body of water based on receiving a second signal from the transducer 350. The second signal may include a second command to stop recording the sonar data 342 received from and generated by the transducer 350.

The data manager 320 may include computer-executable instructions related to a detection handler or software module 324 configured to automatically trigger at least one event upon receiving the sonar data 342 from the transducer 350. The at least one event may include automatically recording the sonar data 342 received from and generated by the transducer 350. In some examples, the detection handler 324 may be configured to automatically trigger at least one other event upon receiving the second signal. The at least one other event may include stopping (or terminating) recording of the sonar data 342 received from and generated by the transducer 350.

The data manager 320 may include computer-executable instructions related to a storage handler or software module 326 configured to automatically record the sonar data 342 in memory (e.g., memory 312 and/or database 340) upon receiving the sonar data 342 from the transducer 350. In some examples, recording the sonar data 342 generated by the transducer 350 may include logging the sonar data 342 generated by the transducer 350 and the geographical coordinate data (i.e., GPS data 344) generated by a GPS transceiver 318 associated with the transducer 350. In some examples, the storage handler 326 may be configured to automatically upload the sonar data 342 and/or the GPS data 344 to at least one database via a network, such as, e.g., a remote server database (e.g., cloud based server) via a communication network (e.g., cloud based network), including a wireless communication network.

The data manager 320 may include computer-executable instructions related to a display handler or software module 328 configured to display images associated with the sonar data 342, e.g., to a user via the display device 370. The display handler 328 may be configured to generate image data 346 associated with the sonar data 342 and further display images generated from the image data 346 and sonar data 342 to a user via a display, such as the display device 370. The display handler 328 may be configured to display images associated with a map to the user based on the sonar data 342 and the geographical coordinate data (i.e., GPS data 344).

As shown in FIG. 3A, the system 300A further includes the transducer 350, such as a sonar transducer, associated with the computing device 304. In various implementations, the term sonar (i.e., SOund Navigation And Ranging) generally refers to various techniques for propagating sound underwater to detect objects on or under a surface of a body of water, such as fish, plants, rocks, sea floor, etc. One type of sonar technology refers to active sonar that is configured to emit pulses of sound waves while receiving echoes, which refers to pinging. Further, sonar may be used to determine acoustic locations and/or measurements of echo characteristics for targets and objects in a body of water. Still further, acoustic frequencies used in sonar related systems may vary from low frequency (i.e., infrasonic) to high frequency (i.e., ultrasonic).

The transducer 350 may include a sensor 352, such as a dedicated sensor, configured to automatically sense deployment of the transducer 350 in a body of water. In some examples, automatically sensing deployment of the transducer 350 in the body of water may occur after casting the transducer 350 in the body of water by a user. In other examples, automatically sensing deployment of the transducer 350 in the body of water may occur after launching a vessel (e.g., a boat) in the body of water, wherein the transducer 350 may be coupled (e.g., mounted) to the vessel. In some other examples, automatically sensing deployment of the transducer 350 in the body of water may trigger a control signal to power-up the transducer 350 to begin transmitting or relaying sonar data to the computing device 304 via the transceiver 364. Further, as described herein, the transducer 350 may be configured to automatically sense removal from the body of water, which may trigger another control signal to power-down the transducer 350 to thereby stop or terminate the transmitting or relaying of sonar data to the computing device 304 via the transceiver 364.

In one implementation, the sensor 352 may include an electronic circuit having an open circuit portion with at least two separate terminals with each terminal attached to exposed electrodes configured to conduct electricity therebetween when water in between the electrodes provides a closed circuit at the open circuit portion. Generally, water including electrolytes is conductive when an electrical current is applied. When the transducer 350 is placed in the body of water, the electrodes are configured to conduct electricity when water is present between the electrodes, to thereby complete a water sensing circuit of the sensor 352 and provide an indication signal that the transducer 350 is deployed in water and/or a body of water. In this manner, the sensor 352 is configured to automatically sense deployment of the transducer 350 in the body of water and provide one or more signals indicative thereof, including a first signal and a second signal. For example, the first signal may be indicative of a first command to start recording sonar data generated by the transducer 350. The second signal may be indicative of a second command to stop recording sonar data generated by the transducer 350. These sensing signals may be transmitted to the computing device 304 via the transceivers 314, 364 for processing by the at least one processor 310 and storage in the memory 312 and/or the database 340.

In one implementation, the transducer 350 may be part of a device configured to at least partially float on a surface of the body of water. In another implementation, the transducer 350 may be part of a device configured to at least partially submerge below a surface of the body of water. Since the device is castable by a user, this device may be referred to as a castable sonar transducer.

The transducer 350 may be configured to include the transceiver 364. The transducer 350 may be configured to interface and communicate with the computing device 304 via the transceiver 364, such as a RF transceiver, which may be configured to wirelessly communicate with the corresponding transceiver 314 of the computing device 304 via a wireless communication channel. Using the transceivers 314, 364, various types of data including sonar data 342 may be communicated, transmitted, and/or relayed between the transducer 350 and the computing device 304. Once the sonar data 342 is transferred, the database 340 of the computing device 304 may be configured to automatically store/record the received sonar data 342 associated with the transducer 350. In some examples, the database 340 may be further configured to automatically store/record image data 346 associated with the sonar data 342.

The transducer 350 may be configured to include a sonar element, such as a sonar transducer element 366. The transducer 350 may be configured to use sonar technology to evaluate attributes of a target object by interpreting echoes from sound waves. In various examples, the transducer 350 may be configured to actively generate low and/or high frequency sound waves and evaluate echoes received back by the transducer 350 to thereby measure time intervals between sending signals and receiving corresponding echoes to determine distance to the target object. The transducer 350 may be configured to convert energy into sound waves via transducer elements, such as piezoelectric transducers or capacitive transducers that are configured to convert electrical energy into sound. The transducer 350 may be configured to use piezoelectric crystals that include a property of changing size when a voltage is applied, whereby applying an alternating current (AC) across the piezoelectric crystals causes oscillations at high frequencies, to thereby generate high frequency sound waves. Further, focusing the sound generated by the transducer 350 may be determined by an area and shape of the transducer 350, the sound wave frequency of the transducer 350, and the sound velocity of the propagation medium, such as the body of water. The sonar transducer element 366 may use piezoelectric crystals configured as transceivers to transmit and detect sound waves in one or more elements, including propagating sound waves and receiving echoing sound waves.

FIG. 3B illustrates another system 300B for operating a sonar transducer in accordance with implementations of various techniques described herein. FIG. 3B includes similar elements as shown and described in reference to FIG. 3A.

For instance, the computing device 304 and components thereof include similar scope and functionality of the computing device 304 and components shown in FIG. 3A. Likewise, the transducer 350 and components thereof include similar scope and functionality of the transducer 350 and components shown in FIG. 3A.

In one implementation, the transducer 350 may include at least one processor 360, memory 362 (e.g., non-transitory computer-readable storage medium), at least one database 380, power, peripherals, and various other computing elements and/or components that may not be specifically shown. The transducer 350 may include instructions recorded on a non-transitory computer-readable medium, e.g., the memory 362, and executable by the at least one processor 360.

The transducer 350 may be configured to interface and communicate with the computing device 304. The transducer 350 may include the transceiver 364 configured to communicate with a corresponding transceiver 314 of the computing device 304. Using the transceivers 314, 364, various types of data including sonar data 342 generated by the sonar transducer element 366 of the transducer 350 may be communicated, transmitted, and/or relayed between the transducer 350 and the computing device 304. Further, the database 380 may be configured to store/record the sonar data 342 generated by the sonar transducer element 366 of the transducer 350. The database 340 may be further configured to store image data 346 associated with the sonar data 342.

FIG. 3C illustrates another system 300C for operating a sonar transducer in accordance with implementations of various techniques described herein. FIG. 3C includes similar elements as shown and described in reference to FIGS. 3A and 3B.

For instance, the computing device 304 and components thereof include similar scope and functionality of the computing device 304 and components shown in FIGS. 3A and 3B. Likewise, the transducer 350 and components thereof include similar scope and functionality of the transducer 350 and components shown in FIGS. 3A and 3B.

In FIG. 3C, the transducer 350 may include one or more elements and/or components of the computing device 304 that are configured in a manner as described in reference to FIG. 3A. For instance, the transducer 350 may include the data manager or software module 320 that is configured in a manner as described in reference to FIG. 3A. Further, the transducer 350 may include one or more software modules related to the deployment handler 322, detection handler 324, storage handler 326, and display handler 328, each of which may be configured in a manner as described in reference to FIG. 3A. For example, these software modules may be configured to process the sonar data 342 at the transducer 350 using the at least one processor 360 and provide the processed data and information to the computing device 104 via the transceivers 314, 364 for storing/recording thereof in the database 340 of the computing device 304.

In some implementations, the database 380 may be configured to store/record data related to one or more of the sonar data 342 and the image data 346 generated by the sonar transducer element 366 of the transducer 350. Further, the database 380 may be configured to store/record data related to GPS data 344 received from the computing device 304. The database 340 may be configured to store/record image data 346 associated with the sonar data 342 and the GPS data 344. As described herein, one or more of the sonar data 342, the GPS data 344, and the image data 346 may be uploaded to a remote server over the network via the network interface 316. In reference to displaying sonar images, some computing devices, other than the computing device 304, may not be able to recognize or display the sonar data 342. In this instance, the computing device 304 may be configured to translate the sonar data 342 into a more globally recognizable image format as the image data 346 for display by other computing devices. After translation, the computing device 304 may be configured to store/record the image data 346 in memory, such as the database 340.

Figure 4:
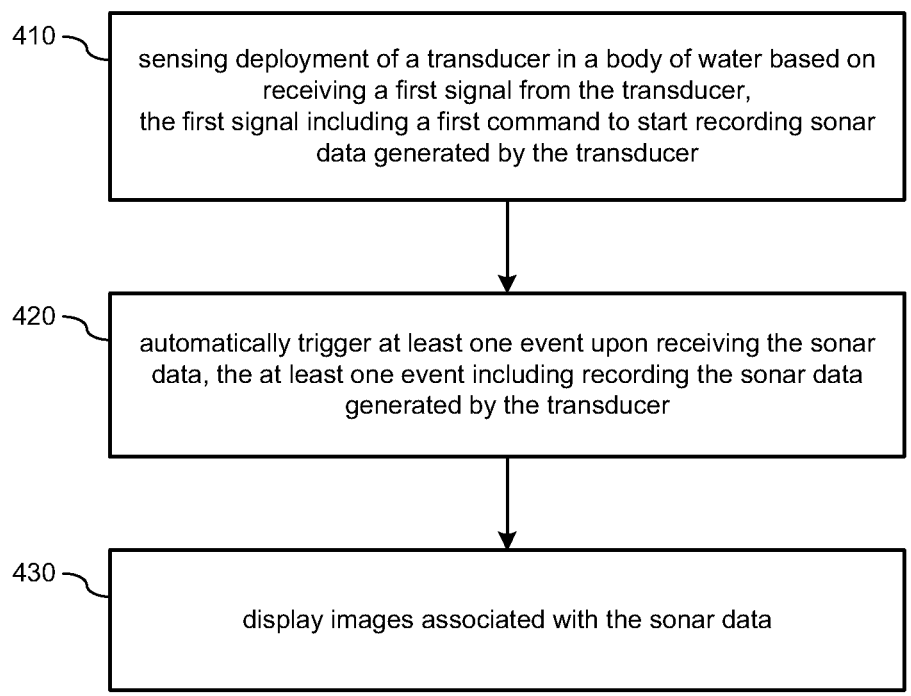
FIGS. 4-5 illustrate process flow diagrams for various methods of operating a sonar transducer in accordance with implementations of various techniques described herein.

FIG. 4 illustrates a flow diagram for a method 400 of operating a sonar transducer in accordance with implementations of various techniques described herein. In one implementation, method 400 may include managing sonar data generated by a transducer, including a sonar transducer. The sonar data may be associated with imaging subsurface environmental features in a body of water. It should be understood that while method 400 indicates a particular order of execution of operations, in some examples, certain portions of the operations might be executed in a different order, and on different systems. Further, in some other examples, additional operations or steps may be added to method 400. Similarly, some operations or steps may be omitted.

In one implementation, method 400 may be implemented as an application on a smart phone device. In other implementations, method 400 may be performed by any computer system (e.g., computer system 600 of FIG. 6), including a portable computer system, a smart phone device, a remote server, a marine electronics device (e.g., device 600 of FIG. 6), a network server, a cloud server and the like.

At block 410, method 400 may sense deployment of a transducer (e.g., a sonar transducer) in a body of water based on receiving at least one signal (e.g., a first signal) from the transducer. The at least one signal (e.g., a first signal) may include at least one command (e.g., a first command) to start storing/recording sonar data generated by the transducer. As described above, the transducer may include a dedicated sensor that may be configured to sense water or detect deployment of the transducer in water. In one implementation, automatically sensing deployment of the transducer in the body of water may occur after casting the transducer in the body of water by a user. In another example, automatically sensing deployment of the transducer in the body of water may occur after launching a vessel in the body of water, wherein the transducer is coupled or mounted to the vessel. In another implementation, sensing deployment of the transducer in the body of water may trigger a control signal to power-up the transducer to thereby begin transmitting or relaying sonar data to a computing device via a transceiver.

At block 420, method 400 may include automatically triggering at least one event upon receiving the sonar data. In one implementation, the at least one event may include the computing device recording the sonar data generated by the transducer. In another implementation, recording the sonar data may include logging the sonar data and geographical coordinate data generated by a GPS transceiver associated with the transducer.

At block 430, the computing device may display images associated with the sonar data. In one implementation, displaying images may include display in gone or more images associated with the sonar data to a user via a display device. In another implementation, displaying images may include displaying images associated with a map based on the sonar data and geographical coordinate data, including uploading the sonar data and the geographical coordinate data to at least one database via a network.

In one implementation, the computing device may automatically upload the sonar data to at least one database via a network. In another implementation, the computing device may sense removal of the transducer from the body of water based on receiving at least one other signal (e.g., a second signal) from the transducer. The at least one other signal (e.g., a second signal) may include at least one other command (e.g., a second command) to stop storing/recording sonar data generated by the transducer.

In some implementations, method 400 may be activated continuously throughout a recreational trip, such as a fishing trip. For example, at the beginning of a fishing trip, the transducer may be activated and sonar data generated by the transducer may be recorded, displayed, and uploaded. In another example, at the end of the recreational trip, the transducer may be deactivated and recording terminated.

Figure 5:
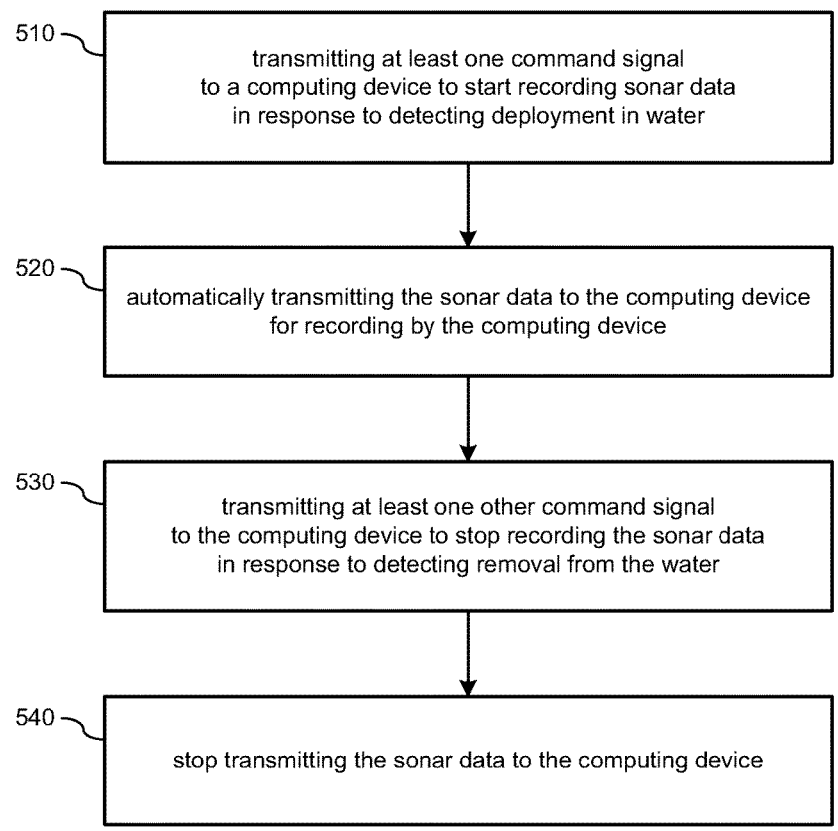

FIG. 5 illustrates another flow diagram for another method 500 of operating a sonar transducer in accordance with implementations of various techniques described herein. In one implementation, method 500 may include managing sonar data generated by a transducer, including a sonar transducer. It should be understood that while method 500 indicates a particular order of execution of operations, in some examples, certain portions of the operations might be executed in a different order, and on different systems. Further, in some other examples, additional operations or steps may be added to the method 500. Similarly, some operations or steps may be omitted.

In one implementation, method 500 may be implemented as an application on a smart phone device. In other implementations, method 500 may be performed by any computer system, including a portable computer system, a smart phone device, a remote server, a marine electronics device (e.g., device 600 of FIG. 6), a network server, a cloud server and the like.

At a beginning of a fishing trip, at block 510, the sonar transducer may transmit at least one command signal (e.g., a first command signal) to a computing device to start recording sonar data in response to detecting deployment in water, e.g., when the boat is placed in the water. In some examples, the transducer may include a dedicated sensor configured to sense water or detect removal of the transducer from water. The dedicated sensor may be configured to provide the at least one command signal (e.g., the first command signal) in response to detecting deployment in water.

Detecting deployment of the transducer in the body of water may occur after casting the transducer in the body of water by a user. In some implementations, automatically detecting deployment of the transducer in the body of water may occur after launching a vessel out of the body of water, wherein the transducer is coupled or mounted to the vessel. In other implementations, the transducer may be configured to automatically sense deployment in the body of water, which may trigger a control signal to power-up the transducer to thereby begin/start communicating, transmitting, and/or relaying of sonar data.

At block 520, the sonar transducer may automatically transmit the sonar data to the computing device for recording by the computing device.

At the end of the trip, at block 530, the sonar transducer may transmit at least one other command signal (e.g., a second command signal) to the computing device to stop storing/recording the sonar data in response to detecting removal from the water, e.g., when the boat is removed from water. In one implementation, the dedicated sensor of the transducer may be configured to sense water or detect removal of the transducer from water. The dedicated sensor may be configured to provide the at least one other command signal (e.g., the second command signal) in response to detecting deployment in water.

For example, detecting removal of the transducer from the body of water may occur after lifting or withdrawing the transducer out of the body of water by a user. As another example, detecting removal of the transducer from the body of water may occur after lifting or withdrawing a vessel out of the body of water, wherein the transducer is coupled or mounted to the vessel. In one implementation, the transducer may be configured to automatically sense removal from the body of water, which may trigger another control signal to power-down the transducer to thereby stop or terminate the communicating, transmitting, and/or relaying of sonar data.

At block 540, the sonar transducer may include stop/terminate transmitting the sonar data to the computing device. In some implementations, the transducer may be configured to stop/terminate communicating, transmitting, and/or relaying data including the sonar data via the communication channel.

In one implementation, the computing device may automatically upload the sonar data to at least one database via a network. The computing device may further display images associated with a map based on the sonar data and geographical coordinate data, and uploading the sonar data and the geographical coordinate data to at least one database via a network.

In some implementations, method 500 may be activated continuously throughout a recreational trip, such as a fishing trip. For example, at the beginning of a fishing trip, the transducer may be activated and sonar data generated by the transducer may be recorded, displayed, and uploaded. Further, in another example, at the end of the recreational trip, the transducer may be deactivated and recording terminated.

Computing System

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network, e.g., by hard-wired links, wireless links, or combinations thereof. In a distributed computing environment, program modules may be located in both local and remote computer storage media including memory storage devices.

Marine Computing System

Figure 6:
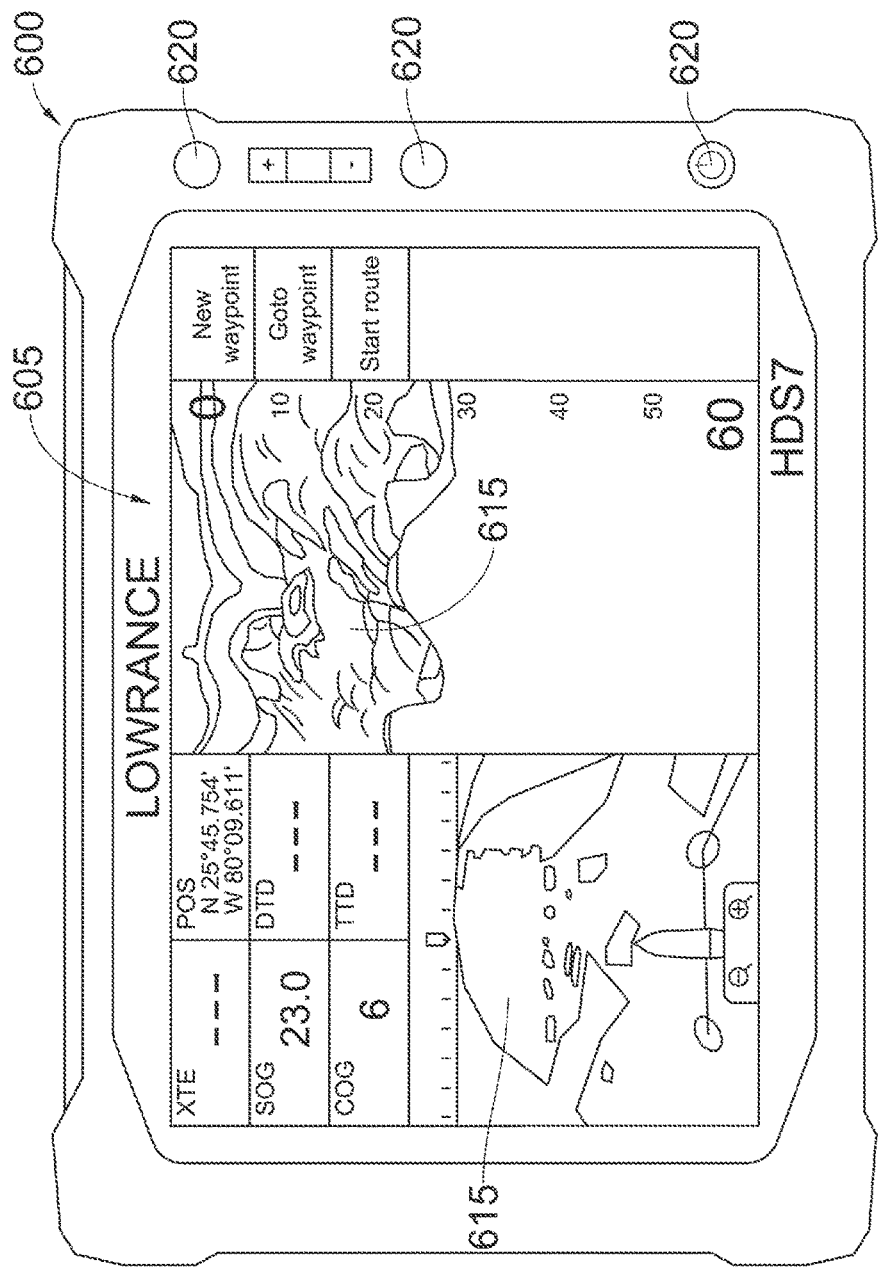
FIG. 6 illustrates a schematic of a marine electronics device in accordance with implementations of various techniques described herein.

FIG. 6 illustrates an example schematic of a marine electronics device 600 in accordance with implementations of various techniques described herein. The marine electronics device 600 includes a screen 605. In certain implementations, the screen 605 may be sensitive to touching by a finger. In other implementations, the screen 605 may be sensitive to the body heat from the finger, a stylus, or responsive to a mouse. The marine electronics device 600 may be attached to a National Marine Electronics Association (NMEA) bus or network. The marine electronics device 600 may send or receive data to or from another device attached to the NMEA 2000 bus. For example, the marine electronics device 600 may transmits commands and receive data from a motor or a sensor using an NMEA 2000 bus. In one implementation, the marine electronics device 600 may be capable of steering a vessel and controlling the speed of the vessel, i.e., autopilot. For example, one or more waypoints may be input to the marine electronics device 600, and the marine electronics device 600 may steer a vessel to the one or more waypoints. The marine electronics device 600 may transmit or receive NMEA 2000 compliant messages, messages in a proprietary format that do not interfere with NMEA 2000 compliant messages or devices, or messages in any other format. The device 600 may display marine electronic data 615. The marine electronic data types 615 may include chart data, radar data, sonar data, steering data, dashboard data, navigation data, fishing data, engine data, and the like. The marine electronics device 600 may also include a plurality of buttons 620, which may be either physical buttons or virtual buttons, or a combination thereof. The marine electronics device 600 may receive input through a screen 605 sensitive to touch or buttons 620.

As mentioned above, a marine computing system may be used to record and process sonar data. In one implementation, the marine computing system may take the form of a marine electronics device 600.

The marine electronics device 600 may be operational with numerous general purpose or special purpose computing system environments or configurations.

The marine electronics device 600 may include any type of electrical and/or electronics device capable of processing data and information via a computing system. In one implementation, the marine electronics device 600 may be a marine instrument, such that the marine electronics device 600 may use the computing system to display and/or process the one or more types of marine electronics data.

The computing system may include a central processing unit (CPU), a system memory, a graphics processing unit (GPU), and a system bus that couples various system components including the system memory to the CPU. In various examples, the computing system may include one or more CPUs.

The CPU may include a microprocessor, a microcontroller, a processor, a programmable integrated circuit, or a combination thereof. The CPU can comprise an off-the-shelf processor such as a Reduced Instruction Set Computer (RISC), or a Microprocessor without Interlocked Pipeline Stages (MIPS) processor, or a combination thereof. The CPU may also include a proprietary processor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The CPU may provide output data to a GPU. The GPU may generate graphical user interfaces that present the output data. The GPU may also provide objects, such as menus, in the graphical user interface. A user may provide inputs by interacting with the objects. The GPU may receive the inputs from interaction with the objects and provide the inputs to the CPU. A video adapter may be provided to convert graphical data into signals for a monitor (MFD 600). The monitor (MFD 600) includes a screen 605. In certain implementations, the screen 605 may be sensitive to touching by a finger. In other implementations, the screen 605 may be sensitive to the body heat from the finger, a stylus, or responsive to a mouse.

The system bus may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system, such as during start-up, may be stored in the ROM.

The computing system may further include a hard disk drive interface for reading from and writing to a hard disk, a memory card reader for reading from and writing to a removable memory card, and an optical disk drive for reading from and writing to a removable optical disk, such as a CD ROM or other optical media. The hard disk, the memory card reader, and the optical disk drive may be connected to the system bus by a hard disk drive interface, a memory card reader interface, and an optical drive interface, respectively. The drives and their associated computer-readable media may provide nonvolatile storage of computer-readable instructions, data structures, program modules and other data for the computing system.

Although the computing system is described herein as having a hard disk, a removable memory card and a removable optical disk, it should be appreciated by those skilled in the art that the computing system may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules, software modules, or other data. Computer-readable storage media may include non-transitory computer-readable storage media. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system may include a host adapter that connects to a storage device via a small computer system interface (SCSI) bus, Fiber Channel bus, eSATA bus, or using any other applicable computer bus interface.

The computing system can also be connected to a router to establish a wide area network (WAN) with one or more remote computers. The router may be connected to the system bus via a network interface. The remote computers can also include hard disks that store application programs.

In another implementation, the computing system may also connect to the remote computers via local area network (LAN) or the WAN. When using a LAN networking environment, the computing system may be connected to the LAN through the network interface or adapter. The LAN may be implemented via a wired connection or a wireless connection. The LAN may be implemented using Wi-Fi™ technology, cellular technology, Bluetooth™ technology, satellite technology, or any other implementation known to those skilled in the art. The network interface may also utilize remote access technologies (e.g., Remote Access Service (RAS), Virtual Private Networking (VPN), Secure Socket Layer (SSL), Layer 2 Tunneling (L2T), or any other suitable protocol). In some examples, these remote access technologies may be implemented in connection with the remote computers. It will be appreciated that the network connections shown are exemplary and other means of establishing a communications link between the computer systems may be used.

A number of program modules may be stored on the hard disk, memory card, optical disk, ROM or RAM, including an operating system, one or more application programs, and program data. In certain implementations, the hard disk may store a database system. The database system could include, for example, recorded points. The application programs may include various mobile applications ("apps") and other applications configured to perform various methods and techniques described herein. The operating system may be any suitable operating system that may control the operation of a networked personal or server computer.

A user may enter commands and information into the computing system through input devices such as buttons, which may be physical buttons, virtual buttons, or combinations thereof. Other input devices may include a microphone, a mouse, or the like (not shown). These and other input devices may be connected to the CPU through a serial port interface coupled to system bus, but may be connected by other interfaces, such as a parallel port, game port or a universal serial bus (USB).

Certain implementations may be configured to be connected to a global positioning system (GPS) receiver system and/or a marine electronics system. The GPS system and/or marine electronics system may be connected via the network interface. The GPS receiver system may be used to determine position data for the vessel on which the marine electronics device 600 is disposed. The GPS receiver system may then transmit the position data to the marine electronics device 600. In other examples, any positioning system known to those skilled in the art may be used to determine and/or provide the position data for the marine electronics device 600.

The marine electronics system may include one or more components disposed at various locations on the vessel. Such components may include one or more data modules, sensors, instrumentation, and/or any other devices known to those skilled in the art that may transmit various types of data to the marine electronics device 600 for processing and/or display. The various types of data transmitted to the marine electronics device 600 from the marine electronics system may include marine electronics data and/or other data types known to those skilled in the art. The marine electronics data received from the marine electronics system may include chart data, sonar data, structure data, radar data, navigation data, position data, heading data, automatic identification system (AIS) data, Doppler data, speed data, course data, or any other type known to those skilled in the art.

In one implementation, the marine electronics system may include a radar sensor for recording the radar data and/or the Doppler data, a compass heading sensor for recording the heading data, and a position sensor for recording the position data. In a further implementation, the marine electronics system may include a sonar transducer for recording the sonar data, an AIS transponder for recording the AIS data, a paddlewheel sensor for recording the speed data, and/or the like.

The marine electronics device 600 may receive external data via the LAN or the WAN. In one implementation, the external data may relate to information not available from the marine electronics system. The external data may be retrieved from the Internet or any other source. The external data may include atmospheric temperature, tidal data, weather, moon phase, sunrise, sunset, water levels, historic fishing data, and other fishing data.

In one implementation, the marine electronics device 600 may be a multi-function display (MFD) unit, such that the marine electronics device 600 may be capable of displaying and/or processing multiple types of marine electronics data. FIG. 6 illustrates a schematic diagram of an MFD unit in accordance with implementations of various techniques described herein. In particular, the MFD unit may include the computing system, the monitor (MFD 600), the screen 605, and the buttons such that they may be integrated into a single console.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, examples of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium having stored thereon a plurality of computer-executable instructions which, when executed by a computer, cause the computer to:
receive a first signal from a transducer associated with a conductivity sensor configured to automatically sense deployment of the transducer into a body of water, wherein the first signal includes a first command to start recording sonar data generated by the transducer, wherein the transducer comprises a castable sonar transducer, and wherein automatic sensing of deployment of the transducer in the body of water occurs after casting the transducer in the body of water by a user;
determine deployment of the transducer in the body of water based on receiving the first signal from the transducer;
receive sonar data generated by the transducer;
in response to receiving the sonar data subsequent to determining deployment of the transducer, automatically trigger recording of the sonar data generated by the transducer to create a sonar log of the sonar data;
sense removal of the transducer from the body of water based on receiving a second signal from the transducer, the second signal including a second command to stop recording sonar data generated by the transducer; and
automatically trigger stopping recording of the sonar data generated by the transducer.

2. The non-transitory computer-readable medium of claim 1, wherein the computer-executable instructions further cause the computer to:
generate a map of an underwater environment below a surface of the body of water between the surface of the body of water and a bottom of the body of water based on the sonar data.

3. The non-transitory computer-readable medium of claim 1, wherein the computer-executable instructions further cause the computer to:
display images associated with the sonar data on a computer display.

4. The non-transitory computer-readable medium of claim 1, wherein the computer-executable instructions further cause the computer to:
automatically upload the sonar data to at least one database via a network.

5. The non-transitory computer-readable medium of claim 1, wherein recording the sonar data comprises:
associating the sonar data generated by the transducer with geographical coordinate data generated by a global positioning system (GPS) transceiver, wherein the sonar log comprises the associated sonar data and geographical coordinate data.

6. The non-transitory computer-readable medium of claim 5, wherein the computer-executable instructions further cause the computer to:
display a map of the underwater environment below the surface of the body of water based on the sonar data and the geographical coordinate data on a computer display.

7. The non-transitory computer-readable medium of claim 5, wherein the computer-executable instructions further cause the computer to:
upload the sonar log including the associated sonar data and the geographical coordinate data to at least one database via a network.

8. The non-transitory computer-readable medium of claim 5, wherein the computer-executable instructions further cause the computer to:
generate a map of the underwater environment below the surface of the body of water based on the associated sonar data and geographical coordinate data of the sonar log.

9. The non-transitory computer-readable medium of claim 8, wherein generating the map of the underwater environment comprises stitching two or more sonar logs together.

10. A method of operating a sonar transducer comprising:
receiving a first signal from the transducer associated with a conductivity sensor configured to automatically sense deployment of the transducer into a body of water, wherein the first signal includes a first command to start recording sonar data generated by the transducer, wherein the transducer comprises a castable sonar transducer, and wherein automatically sensing deployment of the transducer in the body of water occurs after casting the transducer in the body of water by a user;
determining, by a processor, deployment of the transducer in the body of water based on receiving the first signal from the transducer;
receiving sonar data generated by the transducer;
in response to receiving the sonar data subsequent to determining deployment of the transducer, automatically triggering, by a processor, recording of the sonar data generated by the transducer to create a sonar log of the sonar data;
sensing removal of the transducer from the body of water based on receiving a second signal from the transducer, the second signal corresponding to a second command to stop recording sonar data generated by the transducer; and
automatically triggering stopping recording of the sonar data generated by the transducer.

11. The method of claim 10 further comprising:
generating a map of an underwater environment below a surface of the body of water between the surface of the body of water and a bottom of the body of water based on the sonar data.

12. The method of claim 10, wherein recording the sonar data comprises:
associating the sonar data generated by the transducer with geographical coordinate data generated by a global positioning system (GPS) transceiver, wherein the sonar log comprises the associated sonar data and geographical coordinate data.

13. The method of claim 12 further comprising:
generating a map of the underwater environment below the surface of the body of water based on the associated sonar data and geographical coordinate data of the sonar log.

14. The method of claim 13, wherein generating the map of the underwater environment comprises stitching two or more sonar logs together.

15. A non-transitory computer-readable medium having stored thereon a plurality of computer-executable instructions which, when executed by a computer, cause the computer to:
- receive a first signal from a transducer associated with a conductivity sensor configured to automatically sense deployment of the transducer into a body of water, wherein the first signal includes a first command to start recording sonar data generated by the transducer, wherein the transducer is coupled to a vessel and wherein automatically sensing deployment of the transducer in the body of water occurs after launching the vessel in the body of water;
- determine deployment of the transducer in the body of water based on receiving the first signal from the transducer;
- receive sonar data generated by the transducer;
- in response to receiving the sonar data subsequent to determining deployment of the transducer, automatically trigger recording of the sonar data generated by the transducer to create a sonar log of the sonar data;
- sense removal of the transducer from the body of water based on receiving a second signal from the transducer, the second signal corresponding to a second command to stop recording sonar data generated by the transducer; and
- automatically trigger stopping recording of the sonar data generated by the transducer.

16. The non-transitory computer-readable medium of claim 15, wherein the computer-executable instructions further cause the computer to:
generate a map of an underwater environment below a surface of the body of water between the surface of the body of water and a bottom of the body of water based on the sonar data.

17. The non-transitory computer-readable medium of claim 15, wherein the computer-executable instructions further cause the computer to:
display images associated with the sonar data on a computer display.

18. The non-transitory computer-readable medium of claim 15, wherein recording the sonar data comprises:
associating the sonar data generated by the transducer with geographical coordinate data generated by a global positioning system (GPS) transceiver, wherein the sonar log comprises the associated sonar data and geographical coordinate data.

19. The non-transitory computer-readable medium of claim 18, wherein the computer-executable instructions further cause the computer to:
generate a map of the underwater environment below the surface of the body of water based on the associated sonar data and geographical coordinate data of the sonar log.

20. The non-transitory computer-readable medium of claim 18, wherein generating the map of the underwater environment comprises stitching two or more sonar logs together.

* * * * *